(12) United States Patent
Morrison

(10) Patent No.: US 6,888,785 B2
(45) Date of Patent: May 3, 2005

(54) FAULT TOLERANCE MECHANISM FOR A STORAGE DEVICE THAT STORES DATA IN STACKS WITHIN AN INTEGRAL STORAGE MEDIUM

(75) Inventor: John M. Morrison, Sunnyvale, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 659 days.

(21) Appl. No.: 10/057,496

(22) Filed: Jan. 25, 2002

(65) Prior Publication Data

US 2003/0142595 A1 Jul. 31, 2003

(51) Int. Cl.$^7$ ................................................ G11B 7/00
(52) U.S. Cl. .................................................... 369/103
(58) Field of Search ........................ 369/94, 103, 275.1, 369/109.2; 359/11, 12, 15, 21, 22, 25, 3

(56) References Cited

U.S. PATENT DOCUMENTS

| | | | | |
|---|---|---|---|---|
| 3,947,640 A | * | 3/1976 | Ruell et al. .................... | 369/97 |
| 5,007,690 A | * | 4/1991 | Chern et al. .................. | 369/103 |
| 5,377,176 A | * | 12/1994 | Redfield ....................... | 369/103 |
| 5,477,347 A | * | 12/1995 | Redfield et al. ............... | 369/94 |
| 5,511,058 A | * | 4/1996 | Visel et al. ................... | 369/103 |
| 5,566,387 A | * | 10/1996 | Dewald ......................... | 369/103 |
| 5,592,462 A | | 1/1997 | Beldock et al. | |
| 5,621,549 A | | 4/1997 | Redfield | |
| 5,638,193 A | * | 6/1997 | Trisnadi et al. .............. | 369/103 |
| 5,838,650 A | | 11/1998 | Campbell et al. | |
| 6,154,432 A | | 11/2000 | Faruqi et al. | |
| 6,160,782 A | * | 12/2000 | Kayanuma et al. .......... | 369/103 |

OTHER PUBLICATIONS

"Lucent and Imation Join up to Develop Holographic Storage," Vital Signs/VisionNet, Aug. 20, 1999, printed from Internet Sep. 5, 2001, 1 page.

"Holographic Memory," John Sand, http://www.optics.Arizona.edu/Glenn/holograp1.htm, Apr. 10, 2002, 6 pages.

Proceedings of the Computer Science Discipline Seminar Conference (CSCI 3901), University of Minnesota, Morris–Division of Science and Mathematics, printed from http://mrs.umn.edu/~lopezdr/seminar/sp2000.html, Jan. 16, 2003, 1 page.

"Holographic Data Storage," IBM, vol. 44, No. 3, May 2000, 14 pages.

"Holographic Data Storage," IBM, Science and Technology at Almaden, printed from http://www.almaden.ibm.com/sst/storage/alternative_storage/holographic.html Sep. 5, 2001, 1 page.

"3D Volume Holographic Optical Data Storage Nan Technology," Colossal Storage Corporation, printed from http://www.colossalstorage.net Sep. 5, 2001, 8 pages.

(Continued)

Primary Examiner—Thang V. Tran
Assistant Examiner—Bach Vuong
(74) Attorney, Agent, or Firm—Robert C. Kowert; Meyertons, Hood, Kivlin, Kowert & Goetzel, P.C.

(57) ABSTRACT

In one embodiment, a storage device includes a controller, an integral storage medium that includes one or more stacks, where each stack includes multiple storage locations that are distributed throughout a portion of the volume of the integral storage medium, and an access mechanism that is configured to access the integral storage medium. The controller is configured to receive a command to write a unit of primary data to a first storage location. The controller is configured to generate a unit of redundant data corresponding to the unit of primary data and to control the access mechanism so that the unit of primary data is written to the first storage location in a first stack and the unit of redundant data is written to a second storage location within the integral storage medium.

40 Claims, 5 Drawing Sheets-

OTHER PUBLICATIONS

"Holographic Data Storage," GEEK.com, posted Jan. 31, 2001, 6 pages.

"How Holographic Memory Will Work," Kevin Bonsor, printed from www.howstuffworks.com/holographic–memory.htm on Sep. 5, 2001, 4 pages.

Bell Laboratories, Physical Sciences Research, Miscellaneous pages printed from www.bell–labs.com/org/physical-sciences/projects/hdhds/2.html; 3.html; 4.html; 5.html; 6.html, 5 pages.

* cited by examiner

FAULT TOLERANCE MECHANISM FOR A STORAGE DEVICE THAT STORES DATA IN STACKS WITHIN AN INTEGRAL STORAGE MEDIUM

BACKGROUND OF THE INVENTION

1. Field of the Invention

This invention relates to fault tolerant storage systems and storage devices that store data in stacks within an integral storage medium.

2. Description of the Related Art

One goal of storage system developers is to increase the density of storage devices. Currently, many commercially available devices are limited in that they only use the surface of the storage medium for data storage. In order to overcome this limitation, commercial versions of new storage technologies are being developed that use the physical volume of the storage medium for data storage. These storage devices may provide significantly improved storage density over surface-only storage devices.

One volume-storage technique involves storing holograms of pages of data as diffraction gratings. The diffraction gratings are created by shining a data beam that has been modulated by the page of data and a reference beam onto a selected area of the storage medium. The reference and data beams create an interference pattern that is stored on the selected area of the storage medium as a diffraction grating. The data is retrieved by shining the reference beam onto the selected area, which regenerates the data beam. The resultant data beam is projected onto a CCD (Charge Coupled Display) reader or other photosensitive detector that converts the image into the page of digital data. This storage technique, referred to as holographic storage, offers both improved storage density and improved access speeds. Improved access speeds are possible since data may be accessed in pages instead of in bits. Multiple pages may be stored in a "stack" within the same physical volume of the storage medium by using a different angle and/or phase of the reference beam to access each different storage location within a particular stack.

Another volume storage technique involves integrating multiple surface-only storage media in such a way that a multi-layer storage medium is created. Typically, the resulting storage medium is accessible by a single read and/or write mechanism. For example, in U.S. Pat. No. 5,202,875, multiple light transmissive CDs (Compact Discs) are stacked together to form an integrated, multi-layer disk storage medium. Each layer transmits light so that a laser used to read data can access all of the layers. Each layer may be accessed by focusing the laser on that layer. Data can be stored in "stacks" by storing different units of data to the same position on different layers. The multi-layer volume storage medium provides improved storage density over single layer storage media. Such a multi-layer volume storage medium differs from a conventional set of hard disk platters in that the multiple layers are united into a single storage medium that may be accessed by a single access mechanism. In contrast, conventional hard disk platters are spatially separated and cannot be accessed by the same access mechanism.

Many conventional storage arrays that include multiple surface-only storage devices provide protection against data loss by storing redundant data. Such redundant data may include parity information (e.g., in systems using striping) or additional copies of data (e.g., in systems providing mirroring). The redundant data is stored on a different device than the device on which the data it protects is stored. For example, in a conventional RAID (Redundant Array of Independent Disks) system, an array of disk drives is controlled by a RAID controller (which may be implemented in hardware and/or software). The RAID controller causes redundant data (e.g., a parity block for a stripe or a mirrored copy) to be stored on a different disk than the primary data. In other systems, redundant data may be stored during a back-up operation. For example, a system operator may copy primary data from one or more hard disks to a tape backup system. It is desirable to be able to protect data stored in a stack within a storage medium against data loss.

SUMMARY

Various embodiments of a method and system for providing a fault tolerant storage device are disclosed. In one embodiment, a storage device includes a controller, an integral storage medium that includes one or more stacks, where each stack includes multiple storage locations that are distributed throughout a portion of the volume of the integral storage medium, and an access mechanism that is configured to access the integral storage medium. The controller is configured to receive a command to write a unit of primary data to a first storage location. In response to the write command, the controller is configured to control the access mechanism so that the unit of primary data is written to the first storage location in a first stack and a corresponding unit of redundant data is written to second storage location within the storage medium. The controller may generate the redundant data (e.g., by calculating the parity of several units of primary data). In some embodiments, the redundant data may be a copy of the primary data.

The redundant data may be stored in a storage location within the first stack in some embodiments. For example, the storage medium may be a holographic storage medium and the first and second storage locations may be accessed by varying one or more reference beam characteristics (e.g., reference beam angle, reference beam wavelength, and/or reference beam phase). In another example, the storage medium may be a multi-layer optical storage medium and the redundant data may be stored to a storage location on a different layer within the same stack as the first storage location. In other embodiments, the redundant data may be stored in a second storage location that is included in different stack than the primary data is stored in.

In another embodiment, a storage device includes an integral storage medium that stores data in stacks, a controller configured to receive a command to read data from a first storage location in a first stack, and an access mechanism coupled to the controller and configured to access storage locations within the storage medium. If a read error is detected at the first storage location, the controller is configured to control the access mechanism to access redundant data stored in a second storage location. The redundant data corresponds to the primary data stored at the first storage location and may be used to satisfy the read command. For example, the redundant data may be a copy of the primary data stored at the first storage location, so the read command may be performed by reading the redundant data.

The controller may be configured to mark the first storage location as a failed storage location if a certain number of read errors are detected at the first storage location. If the first storage location is marked as failed, the controller may be configured to access the second storage location in response to subsequent commands to read data from the first storage location.

In some embodiments, a storage device may include means for storing data (e.g., a storage medium as shown in FIGS. 1–2 and 4A–4B) that include one or more stacks, where each of the stacks includes a plurality of storage locations that are distributed throughout the volume of the means for storing data. The storage device may also include means for accessing data stored on the means for storing data, and means for controlling the means for accessing data. The means for controlling are configured to receive a command to access a first unit of data stored on a first storage location within a first one of the stacks. If an error is detected for the first storage location, the means for controlling are configured to access a unit of redundant data stored at a second storage location within the means for storing data.

BRIEF DESCRIPTION OF THE DRAWINGS

A better understanding of the present invention can be obtained when the following detailed description is considered in conjunction with the following drawings, in which.

Figure 1:
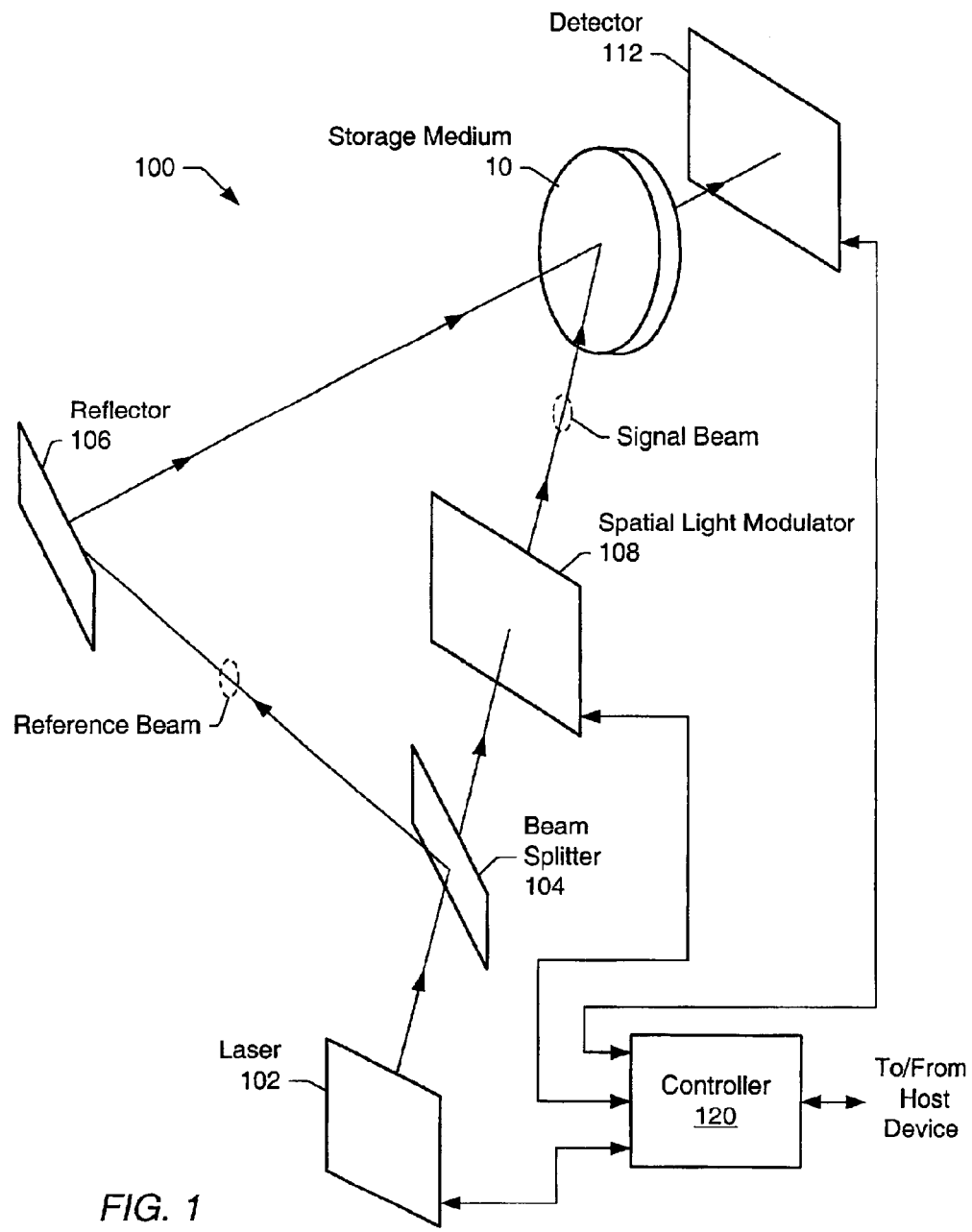
FIG. 1 illustrates one embodiment of a storage device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one embodiment of a fault tolerant storage device 100 that includes a storage medium 10, which is capable of storing data in stacks. Storage device 100 is configured to read and/or write data in response to commands from a host device. In this embodiment, storage device 100 is a holographic storage device. Note that other embodiments of a storage device 100 may not use holographic storage. For example, other embodiments may include several light transmissive data layers that are integrated into a single storage medium and accessed by a single access mechanism, as shown in FIG. 4. Generally, a storage device 100 includes at least one integrated storage medium that has one or more stacks of storage locations, where storage locations in each stack are distributed throughout (at least a portion of) the volume of the storage medium.

As used herein, a "stack" is a group of storage locations that are distributed throughout the volume of the storage medium. Thus, in one embodiment, a stack may include storage locations that are located at the same track and sector location but on different layers of a storage medium. Storage locations on different layers may be accessed by focusing a laser onto the different layers. In another embodiment, a stack may be a group of storage locations that are located in the same portion of a holographic storage medium. Each storage location within such a stack may be accessed using different reference beam characteristics, as will be discussed in more detail below.

In FIG. 1, holographic storage device 100 includes a controller 120, laser 102, beam splitter 104, reflector 106, spatial light modulator (SLM) 108, storage medium 10, and detector 112. Controller 120 may control various components in storage device 100 in order to read and/or write data to storage medium 10. In some embodiments, storage device 100 may be configured as a WORM (Write Once, Read Many) device. Thus, while storage device 100 may be able to store data to storage medium 10 a single time, data may be read from storage medium 10 multiple times. In other embodiments, storage device 100 may be able to both read and write data from the storage medium 10 multiple times. In embodiments where a storage medium is WORM or read-only, both data and redundant data may be stored on the storage medium. Storage devices configured to read data from the write-once or read-only storage medium are configured to access the redundant data if an error is detected for the storage location storing the primary data.

Storage medium 10 may be composed of a photosensitive crystal (e.g., lithium niobate crystal) or a photorefractive, photochromic, and/or photochemical polymer material in some embodiments. Storage locations within storage medium 10 may each be configured to store a page of data as a hologram.

Figure 2:
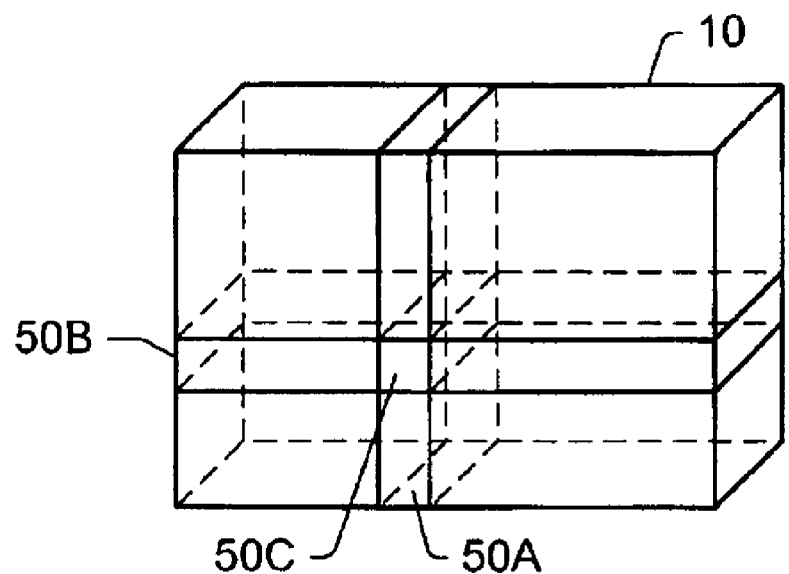
FIG. 2 illustrates one embodiment of a storage medium.

In the illustrated embodiment of FIG. 1, storage medium 10 is shown as a cylindrical storage medium. However, in other embodiments, storage medium 10 may have different shapes (e.g., spherical, conical, or cubical). For example, FIG. 2 shows another example of a storage medium 10 that has a rectangular shape.

As mentioned above, groups of storage locations within the storage medium 10 may be described as stacks. Each stack is stored within a particular physical portion of the storage medium and may be located in terms of one or more coordinates along a two-dimensional surface of storage medium 10. For example, looking at FIG. 2, each stack within one embodiment of storage medium 10 may be located at a unique vertical and/or horizontal location, as shown by exemplary stacks 50A and 50B. Note that in some embodiments, stacks may be identified by two coordinates instead of just one coordinate. For example, a stack 50C may be located using the coordinate values used to locate stacks 50A and 50B. Individual stacks may be identified by a unique value of a coordinate or a unique combination of two coordinate values.

Each stack includes multiple storage locations that are physically distributed throughout the volume of the storage medium at that particular stack location. For example, in a holographic storage device, data may be stored in different storage locations within each stack by using different reference beam characteristics (e.g., reference beam angle and/or wavelength) for each different storage location. Thus, each hologram stored within a stack may be accessed using a different reference beam characteristic. The holograms may overlap each other within the volume of the storage medium defined by the stack.

In a multi-layer optical storage medium (e.g., similar to that shown in FIG. 4), different storage locations within a stack may be located at the same physical location (e.g., track and sector) on different layers of the storage medium.

The different storage locations within each stack may be accessed by focusing a reference beam onto the different layers of the storage medium. An exemplary embodiment of a multi-layer optical storage medium is discussed below with respect to FIG. 4.

In embodiments using a cylindrical storage medium like the one shown in FIG. 1, stacks within the cylindrical storage medium may be located according to which sector and track they are located within. Similarly, in embodiments having a spherical storage medium, parameters such as latitude and longitude may locate stacks. Individual storage locations within each stack may be identified in terms of layers (e.g., in multi-layer optical storage medium) or reference beam characteristics (e.g., in a holographic storage medium). In order to prevent data stored in one stack from interfering with data stored in another stack, storage device 100 may include a mechanism (e.g., one or more movable screens) that blocks light from hitting stacks other than the stack currently being accessed.

In order to locate storage locations, controller 120 may identify each stack within storage medium 10 by a unique coordinate value or set of values. Controller 120 may use one or more additional parameters to identify storage locations within each stack. Controller 120 may derive the appropriate parameter and coordinate values from the address of the storage location (e.g., as received in an access command from a host computer system). For example, storage locations may be addressed using Logical Block Addressing (LBA) (or a similar generic addressing scheme). Such an addressing scheme may generate addresses that do not necessarily correspond to the physical layout of the stacks of storage locations within the storage medium. In some embodiments, storage locations in spatially adjacent stacks may have sequential addresses. However, in some embodiments, storage locations in spatially adjacent stacks may not be sequentially addressed (e.g., to improve access performance by giving an access mechanism more time to perform accesses to sequentially addressed storage locations in embodiments that have moving storage media and/or access mechanisms). Additionally, in some embodiments, storage locations within the same stack may not have sequential addresses.

Generally, each storage location within storage medium stores up to the smallest addressable unit of data that may be accessed within the device 100. For example, in a holographic storage system, each storage location may store up to a page of data. Additionally, each storage location may store additional information used by the storage device controller 120, such as ECC (Error Correcting Code), a failed storage location indication, etc.

Controller 120 may be configured to receive a command specifying a read or write operation and, if the command is a write instruction, a value of the data to be written. In an embodiment of a holographic storage device, if a write command is received, controller 120 may arrange the data as a pattern of bits and provide this pattern to SLM 108. SLM 108 may be a liquid crystal display-type device that encodes a particular data pattern onto a reference beam to create a signal beam. In response to receiving the pattern from controller 120, SLM 108 may be configured to transmit and block light at various positions, where each position corresponds to a single bit. In one embodiment, a position may transmit light if a bit is equal to logical one. If a bit equals logical zero, the position within SLM 108 that corresponds to that bit may block light.

Figure 3:
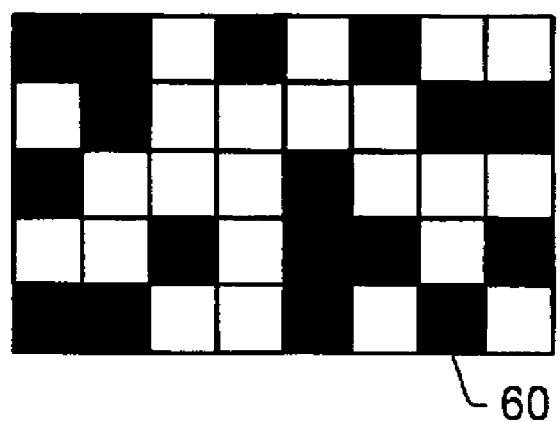
FIG. 3 shows an exemplary SLM pattern that may be generated in one embodiment of a storage device.

FIG. 3 shows one example of how one embodiment of an SLM 108 may transmit and block light according to a pattern that corresponds to a page of data. White squares represent light-transmitting areas of the SLM while dark squares represent light-blocking areas. While the exemplary pattern shown in FIG. 3 represents a relatively small number of bits, actual embodiments of a storage medium may be able to store pages containing thousands, millions, or even larger numbers of bits.

Returning to FIG. 1, laser 102 may output a reference beam that is passed through beam splitter 104 (note that in other embodiments, two laser sources may be used). The SLM 108 modulates one of the beams with the data pattern to create a signal beam. The other reference beam is unmodulated. Controller 120 directs both beams to shine on a specified storage location. Note that storage device 100 may include other optics that further process and/or steer one or both of the signal and reference beams. For example, in many embodiments, collimating lenses may be included to collimate the beams that intersect in the storage medium.

In some embodiments, data may be stored at multiple storage locations within a single stack by changing the characteristics of the reference beam. For example, varying the angle between the reference and the signal beams (e.g., by changing the angle at which the reference beam intersects the stack) also/or varying the wavelength of the beam output by laser 102 may allow different storage locations within a stack to be accessed. Alternatively, the phase of various portions of the reference beam may be changed in order to access different storage locations within a stack. In some embodiments, changes in reference beam wavelength, angle, and phase may be used to access different storage locations. In some embodiments, laser 102 may be implemented as an array of lasers (e.g., a vertical cavity surface emitting laser array or a laser diode array).

Controller 120 may direct the beams onto a stack by moving one or more of laser 102, beam splitter 104, reflector 106, and storage medium 10. In one embodiment, the storage medium may be configured as a cylinder or sphere that is configured to rotate about a central axis (e.g., like a CD).

When the signal and reference beams meet at the specified stack, they interfere with each other to create a hologram. The storage medium 10 is made from a photosensitive material that physically and/or chemically reacts to the light. The hologram is imprinted within a stack as variations in the storage medium's refractive index, light absorption properties, and/or thickness in that stack.

In response to a command to read data from a particular storage location, controller 120 may control the storage device 100 so that the reference beam shines onto the specified stack (e.g., by moving laser 102, reflector 106, detector 112, and/or storage medium 10). The controller may also control various parameters of the reference beam in order to store the data to the correct storage location within the stack. When the reference beam illuminates the stack material, the data beam is regenerated. The data beam may be projected onto a detector 112, which detects the pattern of the data page and converts that pattern into digital data. Detector 112 may be a solid-state camera chip. In one embodiment, the storage device 100 may be configured so that the resultant data beam is projected back onto SLM 108, and SLM 108 may include both a detector and a modulator.

In some embodiments, the mechanism(s) used to access (i.e., read from and/or write to) a storage medium may be configured as stationary access mechanisms. In order to access different stacks within the storage medium, a controller may control an actuator that moves the storage medium. The actuator may rotate, slide, lift, pivot, or otherwise move the storage medium until a desired stack is accessible by the access mechanism. Alternatively, the storage medium may be stationary and all or some of the access mechanism(s) may be movable. In other embodiments, both the storage medium and the access mechanism(s) may be movable.

In some embodiments, storage device 100 may be configured as a read-only device. In such an embodiment, storage device 100 may lack SLM 108.

In order to provide fault tolerance within a storage device, the storage device controller 120 may generate redundant data from primary data and store the redundant data to a different storage location within the same storage medium than the primary data. Generally, redundant data is data that allows primary data to be regenerated if the primary data is destroyed, corrupted, or otherwise rendered unusable or inaccessible. If a read failure occurs for a given storage location, controller 120 may be configured to read the redundant data (and, in some embodiments, other units of primary data needed to regenerate the primary data) associated with the primary data at the failed storage location from the storage medium 10 and to use the redundant data to regenerate or replace the primary data for which the read failure occurred.

In embodiments that include a write-once or read-only storage medium, both primary and redundant data may already be stored on the storage medium (e.g., as described below) and the storage device controller may be configured to access the redundant data if an error is detected at the storage location storing the primary data.

One embodiment of a storage device may be configured to mirror data (i.e., the redundant data is a copy of the primary data) by storing a mirrored copy of primary data. In some embodiments, the redundant data may be stored to a different storage location within the same stack as the primary data. In other embodiments, the redundant data may be stored in a different stack than the primary data.

In some embodiments, the access mechanism may be configured to write to two (or more) storage locations simultaneously. In such embodiments, the controller 120 may be configured to store mirrored copies of primary data to different storage locations (e.g., within the same stack) by causing the access mechanism to write the primary data to the primary data storage location and the redundant data storage location(s) at the same time. In one such embodiment, the read access mechanism may be configured to access a single storage location at a time. Thus, the read mechanism may access a redundant storage location after an error is detected at a primary storage location. In another embodiment, the access mechanism may be configured to read data from both the primary storage location and the redundant storage location(s) at the same time. The controller 120 may compare the data from those storage locations to determine if an error has occurred.

In one embodiment, controller 120 may generate the redundant data as a copy of the primary data (e.g., the primary data may be stored in a buffer and controller 120 may cause the buffer contents to be written to the storage medium two or more times). Thus, the controller may store a unit of redundant data for each unit of primary data written to the storage device. By storing the redundant data, the primary data will be available even if the first storage location is damaged or otherwise rendered inaccessible. Similarly, if a write error occurs when the primary data is written to the first portion, causing the primary data to be incorrect, the storage device may access the redundant copy upon detecting the incorrect primary data. Similarly, if the redundant copy is destroyed or corrupted, the primary data may still be available. Thus, in systems where a single unit of redundant data is stored, a single failure may corrupt either the primary or the redundant data and a valid copy of the data will still be available.

In some embodiments, it may be desirable to provide data protection without mirroring (since if all stored data is mirrored, the size of the storage device is effectively halved). Instead of generating redundant data as a copy of the primary data, the storage device controller may generate a single unit of redundant data for several units of primary data. For example, instead of mirroring data, a storage device controller may generate a unit of parity data from several units (e.g., blocks, pages, etc.) of data. In one embodiment, the units of data and the unit of parity information for those units may be striped across different stacks within the storage medium so that each unit is stored in a different stack. In another embodiment, the primary units and the corresponding redundant unit may be stored in a different storage location within the same stack. If any one of the units are corrupted or destroyed, the remaining units of primary and/or redundant data may be used to regenerate the erroneous unit.

In some embodiments, the storage device may be configured to store multiple units of redundant data in order to provide heightened error protection. For example, a storage device controller may generate two copies of each unit of primary data. In one embodiment, each unit of redundant data may be stored on a different stack than the primary data and the other unit(s) of redundant data. Alternatively, one unit of redundant data may be stored in the same stack as the primary data.

In one embodiment, the redundant data may be stored in a different stack than the primary data but using the same parameters (e.g., the same layer or the same reference beam characteristics) that are used to store the primary data. This may improve access speeds when an access error occurs since adjustments (e.g., to a focusing lens or to the wavelength or phase of a reference beam) may not need to be made between accesses to the primary and the redundant data.

In some embodiments, the stack (or, if the redundant data is stored in the same stack as the primary data, the position within the stack) in which the redundant data is stored may be selected based on the position of the primary data's stack and the movement of the access mechanism and/or storage medium. The storage location for the redundant data may be selected to improve access efficiency in some embodiments. For example, if it takes a certain amount of time to detect an access error, the storage location for the redundant data may be a storage location that will be readily accessible soon after that amount of time, based on the movement of the access mechanism and/or the storage medium. For example, if the storage medium is a spinning storage medium, the storage location may be one that will spin into a position accessible by the access head after an error is detected so that the access mechanism does not have to wait for the storage medium to complete nearly a full rotation (e.g., as it would if the redundant data is stored in the same stack as the primary data) before being able to access the redundant data. In other embodiments, the storage medium and/or access mechanism may be stationary during each access. In such embodiments, the stack in which the redundant data is stored may be the same as or spatially adjacent to the stack in which primary data is stored in order to increase access efficiency.

However, note that other embodiments may store the redundant data in a stack that is more distant from the stack(s) storing the primary data in order to provide protection against spatially localized damage to the storage medium.

The redundant data may be used as a substitute for or to reconstruct the primary data if an error is detected. For example, if an error is detected when data is read from a primary storage location, a mirrored copy of the data may be read from its storage location.

In some embodiments, certain portions of the storage medium may be reserved for storing primary data and other portions may be reserved for storing redundant data. For example, if the redundant data is a mirrored copy of the primary data, half of each stack in the storage device may store primary data and the remaining half of each stack may store redundant data. In such an embodiment, both the primary and the redundant unit of data may be stored in the same stack. Alternatively, each stack may store the redundant data for primary data stored in another stack. In another embodiment, some stacks may be reserved for storing primary data while others may be reserved for storing redundant data. In yet another embodiment, all storage locations may be available to be allocated to either primary or redundant data. A storage device controller may include logic that tracks or calculates which stack (and/or storage location within that stack) redundant data is stored to, based on the storage location(s) of its associated primary data.

As mentioned above, each storage location may store certain housekeeping information for each unit of data. This housekeeping information may include a failed storage location indication and ECC information. Controller 120 may generate error detecting and/or correcting check bits for each unit of data (primary and redundant) stored to a storage location on the storage medium. The check bits are stored to the same storage location as the unit of data with which they are associated (the check bits may be appended to or interspersed with each unit of data stored to the storage medium). In some embodiments, the detection or correction check bits may be used to detect errors that may occur when the unit of data is read. When an error is detected that is not correctable (e.g., because more than the number of correctable errors are detected or because the checkbits only provide error detection), the controller may access the redundant data associated with the primary data in order to regenerate the primary data.

If an error is detected a prespecified number of times for the same storage location, the controller may mark the storage location as a failed storage location (e.g., by setting its failed storage location indication to a certain value). Additionally, the controller may signal a read error to a host computer system for the failed storage location and/or store a new copy of the data stored at the failed storage location to another storage location and remap the address of that storage location to the new storage location.

Figure 4A:
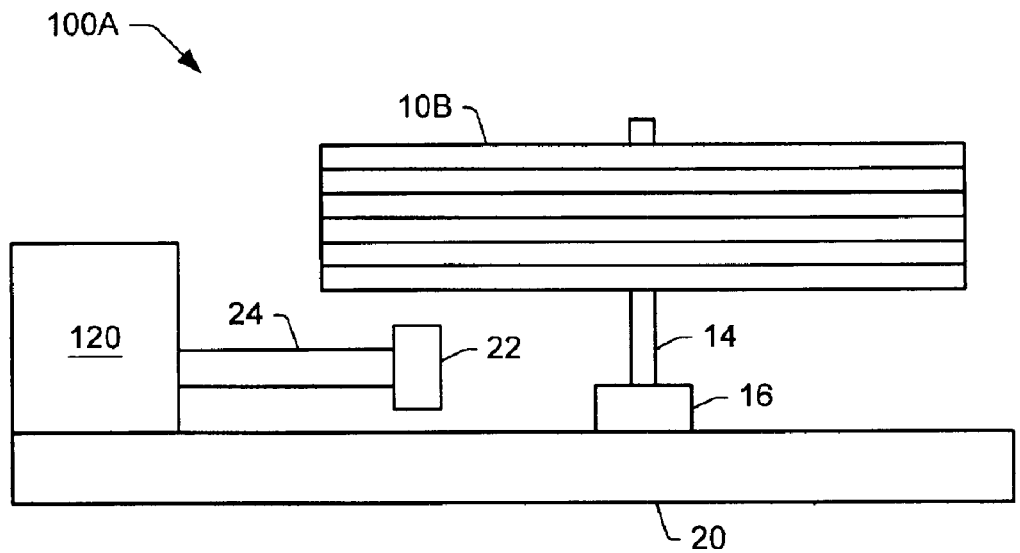
FIGS. 4A–4B shows another embodiment of a storage device.
Figure 4B:
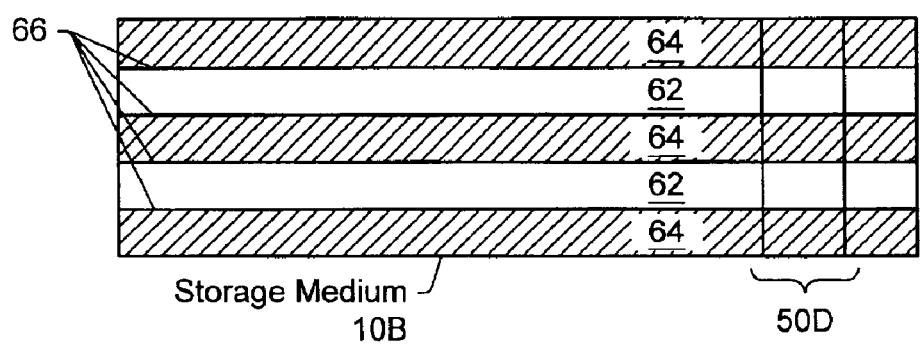

FIG. 4A shows one embodiment of a multi-layer optical storage device 100A. In this embodiment, storage device 100A includes a disk shaped optical data storage medium 10A. Storage medium 10A is mounted on a spindle 14. Storage medium 10 may be removable from storage device 100A. Spindle 14 is attached to a spindle motor 16 that in turn is attached to a system chassis 20. Motor 16 rotates spindle 14 and medium 12.

An optical head 22 is positioned below medium 12. Head 22 is attached to an arm 24 that in turn is connected to an actuator device, such as a voice coil motor, which is controlled by controller 120. The actuator device moves arm 24 and head 22 in a radial direction below medium 12 in response to control signals from controller 120. The optical head may include a focusing lens (not shown) that allows the head 22 to focus on different layers of the storage medium 10 as directed by controller 120. Optical head 22 may access data one bit at a time on storage medium 10A. Controller 120 may be configured to receive access commands from a host computer system and to control the storage device in order to perform those commands.

Each storage location in storage medium 10A may be configured to store one unit of data. Storage locations in the same position (e.g., the same track and the same sector) on different layers of the storage medium are defined as being in the same stack. Controller 120 may be configured to access redundant data stored at a second storage location in storage medium 10A in the event that an access error is detected for a particular unit of primary data stored at a first storage location on storage medium 10A. The redundant data may be stored on a different layer within the same stack as the primary data in some embodiments. If storage medium 10A is not a read-only medium, controller 120 may also be configured to generate redundant data for each unit (or for multiple units) of primary data (as described above) and to store the redundant data to a storage location on storage medium 10A when performing write accesses.

FIG. 4A shows a cutaway view of an exemplary embodiment of a storage medium 10 that may be used in the storage device of FIG. 4A. Storage medium 10 includes a plurality of solid transparent layers 62 that separate a plurality of substrates 64. Substrates 64 are made from a light transmissive material such as glass, polycarbonate or other polymer material. One or more light transmissive data layers 66 are included on each substrate 64. Layers 62 are made of a material that has a different index of refraction than the substrates 64. In one embodiment, layers 62 may include optical cement that holds the substrates 64 together. Storage locations may be defined on each data layer 66. A stack includes one storage location at a particular physical location on each data layer 66, as shown by exemplary stack 50D.

Figure 5:
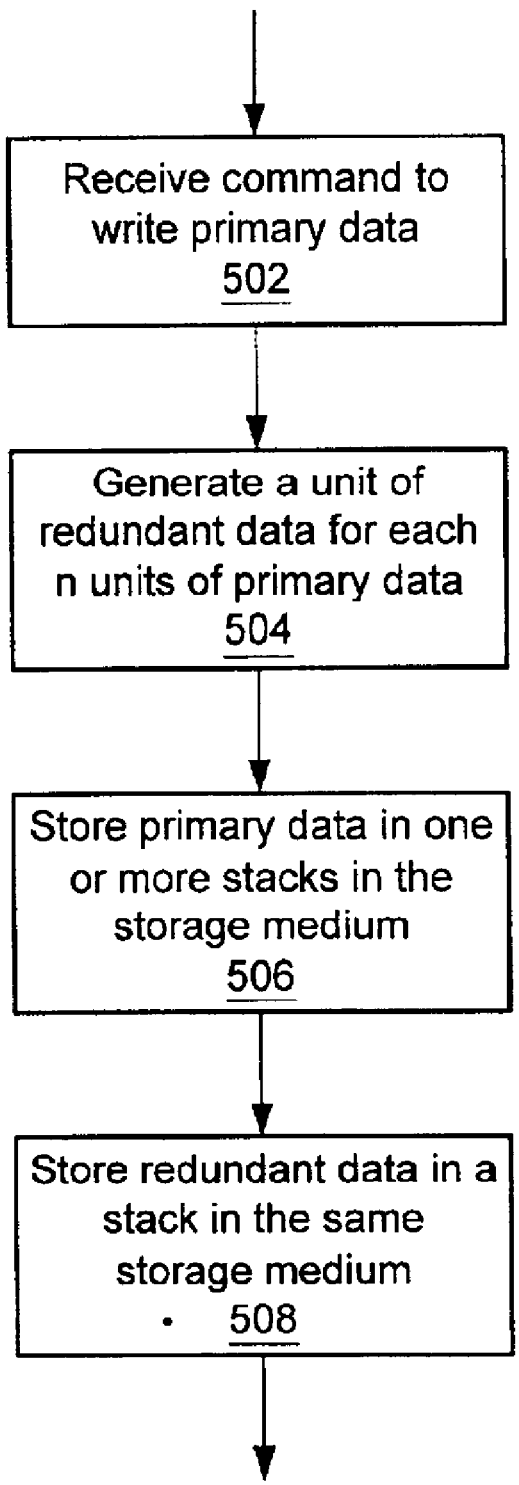
FIG. 5 shows one embodiment of a method of providing fault tolerance in a storage device like the ones shown in FIGS. 1 and 2.

FIG. 5 shows one embodiment of a method of providing fault tolerance in a storage device. The storage device includes a storage medium that is configured to store data in stacks. Storage locations within each stack are distributed throughout a portion of the volume of the storage medium. At 502, a storage device receives a command to write primary data to a specified storage location. In response, the storage device generates redundant data (at 504) and stores the primary data and the redundant data to different storage locations within the same storage medium (at 506 and 508). In one embodiment, the storage device may generate one unit of redundant data for each unit of data (e.g., the redundant data may be a copy of the data). In other embodiments, the storage device may generate a unit of redundant data for a set of units of primary data (e.g., by calculating the parity of the units of primary data). In some embodiments, the storage device may store the redundant data to a different storage location within the same stack as the primary data. In one embodiment, each storage location within a stack may be located on a different layer of the storage medium. In another embodiment, each storage location within a stack may be accessed using one or more different reference beam characteristics.

Figure 6:
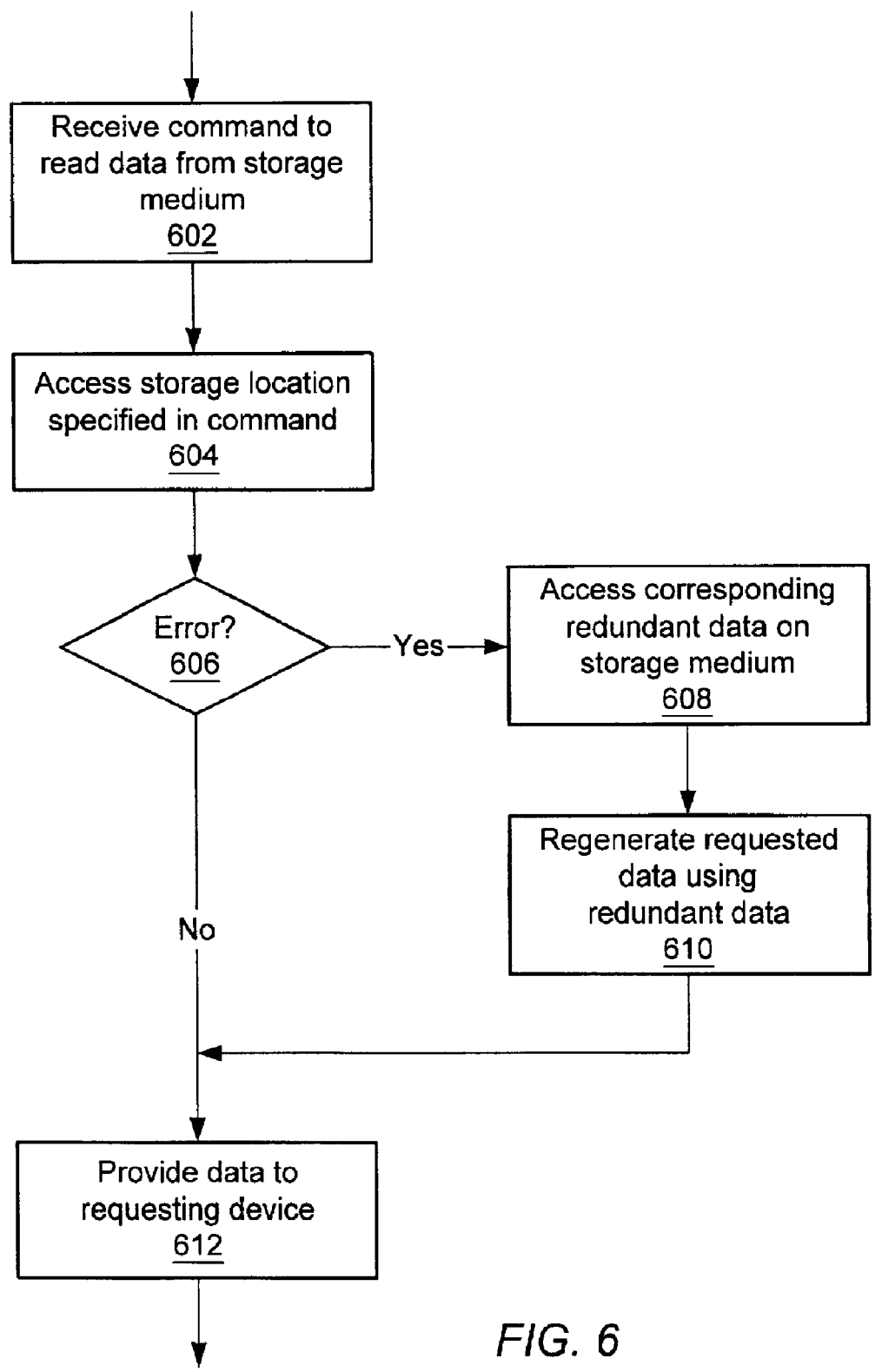
FIG. 6 shows one embodiment of a method of using redundant data to regenerate inaccessible data in a storage device like the ones shown in FIGS. 1 and 2.

FIG. 6 shows one embodiment of a method of operating a fault tolerant storage device. At 602, the storage device receives a command to read data from the storage medium. At 604, the storage device access the storage location specified by the command. If an error occurs (at 606), the storage device access a storage location storing redundant data that corresponds to the data specified in the command, as shown at 608. The storage location storing the redundant data may be located within the same stack as the storage location in which the data requested by the read command is stored in some embodiments. If no error is detected, the data accessed at the specified storage location is provided to the requesting device, as shown at 612.

If an error occurred, the redundant data accessed at 608 is used to regenerate the data requested in the read command, as shown at 610, and this regenerated data is provided to the requesting device at 612. In some embodiments, the redundant data may be a copy of the data, so regenerating the data may simply involve reading the redundant data and providing the redundant data to the requesting device. In other embodiments, regenerating the data may involve accessing several storage locations that store other units of data and calculating the parity of the redundant data and those other units of data to regenerate the data requested in the read command.

Numerous variations and modifications will become apparent to those skilled in the art once the above disclosure is fully appreciated. It is intended that the following claims be interpreted to embrace all such variations and modifications.

What is claimed is:

1. A storage device comprising:
   a integral storage medium comprising one or more stacks, wherein each stack includes a plurality of storage locations that are distributed throughout a portion of a volume of the integral storage medium;
   an access mechanism coupled to the controller and configured to write data to the integral storage medium;
   a controller configured to receive a command to write a unit of primary data to a first storage location, wherein in response to the command to write, the controller is configured to control the access mechanism so that the unit of primary data is written to a first storage location within a first stack of the one or more stacks and a corresponding unit of redundant data is written to a second storage location within one of the one or more stacks included in the integral storage medium.

2. The storage device of claim 1, wherein the second storage location is included in the first stack.

3. The storage device of claim 2, wherein the integral storage medium is a holographic storage medium and wherein the first and second storage locations are accessed by varying one or more reference beam characteristics.

4. The storage device of claim 3, wherein the one or more reference beam characteristics include at least one of reference beam angle, reference beam wavelength, and reference beam phase.

5. The storage device of claim 2, wherein the integral storage medium is a multi-layer optical storage medium.

6. The storage device of claim 5, wherein the second storage location is included on a same layer as the first storage location, wherein the second storage location is not included in the first stack.

7. The storage device of claim 1, wherein the integral storage medium is a holographic storage medium and wherein the first and second storage locations are accessed using the same reference beam characteristics, wherein the second storage location is not included in the first stack.

8. The storage device of claim 1, wherein the controller is configured to receive a command to read the unit of primary data from the first storage location, wherein if the controller detects a read error for the first storage location, the controller is configured to control the access mechanism to read the corresponding unit of redundant data stored in the second storage location, wherein the controller is configured to use the corresponding unit of redundant data to satisfy the command to read.

9. The storage device of claim 1, wherein the controller is configured to receive a command to read the unit of primary data from the first storage location, wherein if a specified number of read errors occur for the first storage location, the controller is configured to set an indication indicating that the first storage location is a failed storage location.

10. The storage device of claim 1, wherein the controller is configured to generate the corresponding unit of redundant data from n units of primary data by generating a parity unit from the n units of primary data.

11. The storage device of claim 10, wherein the controller is configured to generate the corresponding unit of redundant data from one unit of primary data.

12. The storage device of claim 1, wherein the access mechanism is configured to write the unit of primary data to the first storage location and to write the corresponding unit of redundant data to the second storage location at the same time.

13. A storage device comprising:
    a controller configured to receive a command to read data from a first storage location;
    an integral storage medium comprising a plurality of stacks, wherein each stack comprises a plurality of storage locations distributed throughout a portion of a volume of the integral storage medium;
    an access mechanism coupled to the controller and configured to access storage locations within the integral storage medium;
    wherein in response to a read error being detected at the first storage location, the controller is configured to control the access mechanism to access redundant data that corresponds to the data stored in the first storage location, wherein the first storage location is included in a first stack of the plurality of stacks, wherein the redundant data is stored in a second storage location.

14. The storage device of claim 13, wherein the controller is configured to satisfy the command by generating the data from the redundant data.

15. The storage device of claim 13, wherein the unit of redundant data is a copy of the unit of primary data.

16. The storage device of claim 13, wherein the controller is configured to mark the first storage location as a failed storage location in response to the read error being detected at the first storage location a certain number of times.

17. The storage device of claim 16, wherein in response to a second command to read data from the first storage location, the controller is configured to access the redundant data stored in the second storage location if the first storage location is marked as the failed storage location.

18. The storage device of claim 13, wherein the second storage location is included in the first stack.

19. The storage device of claim 18, wherein the integral storage medium is a holographic storage medium and wherein the first and second storage locations are accessed by varying one or more reference beam characteristics.

20. The storage device of claim 18, wherein the integral storage medium is a multi-layer optical storage medium, and wherein the first and second storage locations are located on different layers of the multi-layer optical storage medium.

21. The storage device of claim 13, wherein the second storage location is included in a second stack.

22. The storage device of claim 21, wherein the integral storage medium is a holographic storage medium and wherein the first and second storage locations are accessed using the same reference beam characteristics.

23. A method of using a storage device, the method comprising:

receiving a command to write a unit of primary data to a first storage location within a first stack in an integral storage medium comprised in the storage device, wherein the first stack comprises a plurality of storage locations distributed throughout of portion of a volume of the integral storage medium;

storing the unit of primary data in the first storage location within the first stack; and in response to said receiving, storing a unit of redundant data that corresponds to the unit of primary data to a second storage location within the storage medium.

24. The method of claim 23, wherein said storing the unit of redundant data comprises storing the unit of redundant data to a second storage location within the first stack.

25. The method of claim 24, wherein the integral storage medium is a holographic storage medium and wherein the second storage location is accessed by varying one or more characteristics of a reference beam used to access the first storage location.

26. The method of claim 24, wherein the integral storage medium is a multi-layer optical storage medium, and wherein the first storage location is on a first layer of the multi-layer optical storage medium and the second storage location is on a second layer of the multi-layer optical storage medium.

27. The method of claim 23, wherein the second storage location is in a second stack in the integral storage medium.

28. The method of claim 27, wherein the integral storage medium is a holographic storage medium and wherein the second storage location is accessed using the same reference beam characteristics as are used to access the first storage location.

29. The method of claim 27, wherein the integral storage medium is a multi-layer optical storage medium, and wherein the first storage location and the second storage location are located on a same layer of the multi-layer optical storage medium.

30. The method of claim 23, further comprising the controller calculating the parity of a plurality of units of data to produce the unit of redundant data, wherein the plurality of units of data include the unit of primary data.

31. A method of using a storage device, the method comprising:

receiving a command to read a unit of primary data from a first storage location in a first stack within an integral storage medium, wherein the first stack comprises a plurality of storage locations distributed throughout a portion of a volume of the integral storage medium;

accessing the first storage location; and if an error is detected for the first storage location, accessing a second storage location within the storage medium, wherein the second storage location stores a unit of redundant data corresponding to the unit of primary data.

32. The method of claim 31, further comprising generating the unit of primary data from the unit of redundant data stored at the second storage location.

33. The method of claim 31, wherein the unit of redundant data is a copy of the unit of primary data.

34. The method of claim 31, wherein the second storage location is located within the first stack.

35. The method of claim 34, wherein the integral storage medium is a holographic storage medium and wherein the second storage location is accessed by varying one or more characteristics of a reference beam used to access the first storage location.

36. The method of claim 34, wherein the integral storage medium is a multi-layer optical storage medium, and wherein the first storage location is on a first layer of the multi-layer optical storage medium and the second storage location is on a second layer of the multi-layer optical storage medium.

37. The method of claim 31, wherein the second storage location is in a second stack in the integral storage medium.

38. The method of claim 37, wherein the integral storage medium is a holographic storage medium and wherein the second storage location is accessed using the same reference beam characteristics as are used to access the first storage location.

39. The method of claim 37, wherein the integral storage medium is a multi-layer optical storage medium, and wherein the first storage location and the second storage location are located on a same layer of the multi-layer optical storage medium.

40. A storage device comprising:

integral means for storing data, wherein the means for storing data includes one or more stacks, wherein each of the stacks includes a plurality of storage locations that are distributed throughout a volume of the integral means for storing data;

means for accessing data stored on the integral means for storing data; and means for controlling the means for accessing data, wherein the means for controlling are configured to receive a command to access a first unit of data stored on a first storage location within a first one of the stacks, wherein if an error is detected for the first storage location, the means for controlling are configured to access a unit of redundant data stored at a second storage location within the integral means for storing data.

* * * * *